United States Patent Office 2,937,149
Patented May 17, 1960

2,937,149

COMPOSITION FOR THE REMOVAL OF CORROSION FROM METAL SURFACES

Stanley Hilton, Alvaston, Derby, England, assignor to E. & A. West Limited, Derby, England, a British company No Drawing. Application August 8, 1957
Serial No. 676,922

Claims priority, application Great Britain
August 15, 1956

3 Claims. (Cl. 252—136)

This invention relates to a new or improved preparation for the removal of corrosion from metal surfaces or articles.

It is well known to use an aqueous solution of phosphoric acid for rust removal but it is difficult to obtain a uniform coating of the solution and to maintain it in effective contact with the surface to be treated.

According to the invention there is combined with an aqueous solution of phosphoric acid a substantial proportion of finely ground micaceous material which acts as a thixotropic agent.

A preferred preparation comprises an aqueous solution containing from 25% to 35% of phosphoric acid mixed with 50% to 55% by weight of fine wet-ground mica together with a wetting agent.

The mica is ground to a particle size of between 15 and 60 microns, 50% of the particles preferably being of a size between 15 and 30 microns.

Any convenient wetting agent can be used, but we have found that a particularly suitable wetting agent is that sold commercially under the name Lissapol-N. The quantity of wetting agent used is approximately 1% by volume of the aqueous phosphoric acid solution before the ground mica is added.

Due to its thixotropic nature the mixture when at rest forms a gel, but on stirring or agitation of the mixture its viscosity decreases sharply and the mixture becomes fluid and can readily be applied to a surface to be treated by a brush or any other convenient means. The applied layer returns to a gel on the treated surface very quickly and forms an adherent and coherent coating which does not run so that it can be applied to surfaces lying at any angle and to articles of any shape. This is a very important property of the preparation from a practical point of view as it enables the preparation to be applied rapidly and easily in a liquid state to a surface and ensures the retention of the preparation on the surface since it returns to a gel very rapidly.

The mica is inert so that it is not affected by the phosphoric acid, and unlike soluble thickening agents it does not decrease the penetrating property of the acid. Further, if the mica is left in the pores of the treated surface it has no harmful effect on subsequent painting.

The mica is in the form of minute overlapping plates in the applied coating and these form a reservoir for the active acid solution, fresh solution passing on to the metal surface from between the mica plates by capillary attraction as the acid reacts with the oxide on the surface.

It has been found by experiment that horizontal metal surfaces coated with liquid phosphoric acid rust remover carry the equivalent of 3.24 gms. of phosphoric acid calculated as $H_3PO_4$ per sq. foot and that vertical surfaces carry the equivalent of 1.94 gms. The addition of mica in the proportions we have used enables both horizontal and vertical surfaces to carry the equivalent of 9.9 gms. of $H_3PO_4$ per sq. foot.

Experiments have shown that the improved preparation is extremely effective not only for the removal of rust from ferrous surfaces or articles, including ferrous surfaces which have been plated with chromium or other metal, but also for the removal of verdigris from copper or brass and the removal of surface oxidation from aluminium and light alloys.

I claim:

1. A composition for the removal of corrosion from metal surfaces comprising an aqueous solution containing 25% to 35% of phosphoric acid mixed with 50% to 55% by weight of fine wet-ground mica together with a wetting agent.

2. A composition as in claim 1 wherein said mica is of a particle size between 15 and 60 microns with substantially 50% of the particles of a size between 15 and 30 microns.

3. A composition as in claim 1 wherein the volume of said wetting agent is approximately 1% of the volume of the aqueous phosphoric acid solution before the addition of the mica.

References Cited in the file of this patent

UNITED STATES PATENTS

| | | |
|---|---|---|
| 1,428,084 | Gravell | Sept. 5, 1922 |
| 1,729,767 | Dinley | Oct. 1, 1929 |
| 1,943,253 | Alton | Jan. 9, 1934 |
| 2,220,451 | Hunt | Nov. 5, 1940 |
| 2,362,284 | McDonald | Nov. 7, 1944 |
| 2,393,866 | Wassell | Jan. 29, 1946 |
| 2,672,449 | Snell et al. | Mar. 16, 1954 |
| 2,735,818 | Cardwell et al. | Feb. 21, 1956 |

FOREIGN PATENTS

| | | |
|---|---|---|
| 16,490 | Great Britain | of 1884 |